No. 719,559. PATENTED FEB. 3, 1903.
G. W. BROWN.
LOCK NUT.
APPLICATION FILED JUNE 24, 1902.
NO MODEL.
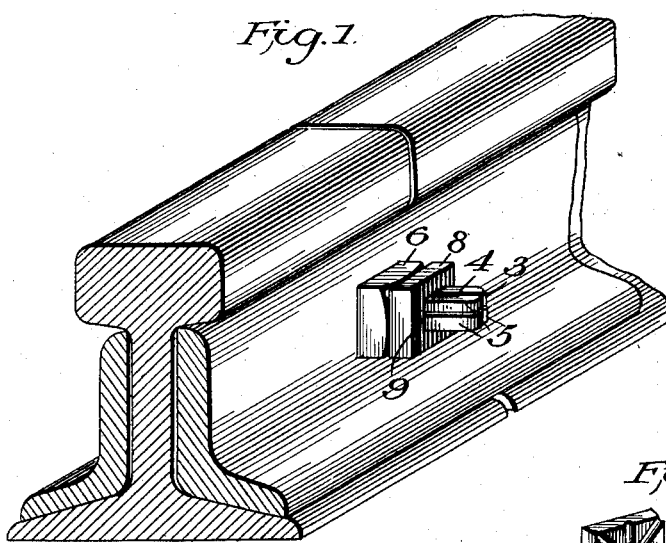
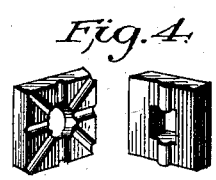
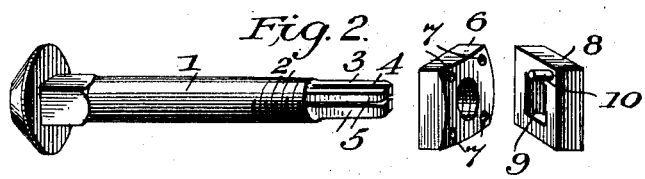
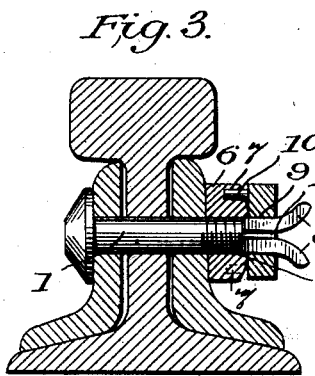
Witnesses:
H. A. McGeorge
F. E. Wadleigh
Inventor:
George W. Brown
by C. B. Wadleigh
Atty

UNITED STATES PATENT OFFICE.

GEORGE W. BROWN, OF VANDALIA, ILLINOIS.

LOCK-NUT.

SPECIFICATION forming part of Letters Patent No. 719,559, dated February 3, 1903.

Application filed June 24, 1902. Serial No. 113,053. (No model.)

*To all whom it may concern:*

Be it known that I, GEORGE W. BROWN, a citizen of the United States, residing at Vandalia, in the county of Fayette and State of Illinois, have invented certain new and useful Improvements in Lock-Nuts; and I do hereby declare the following to be a full, clear, and exact description of the invention, such as will enable others skilled in the art to which it appertains to make and use the same.

This invention relates to certain new and useful improvements in nut-locks applicable for use in various arts; and it has for its object, among others, to provide a simple and cheap yet efficient form of nut-lock by the employment of which the nut upon the bolt may be screwed up to the desired limit, the said nut during such operation being entirely free of the coöperating part, which latter is easily and quickly applied after the nut upon the bolt has been screwed up. When the locking element is placed in position, the nut upon the bolt cannot be turned in either direction. The outer end of the bolt beyond its screw-threads is made polygonal in form and split, the lock-nut having an aperture of corresponding form and provided upon its inner face with a pin or projection, preferably at one corner, and designed to engage any one of a series of openings in the outer face of the nut, which is threaded upon the bolt. The split end of the bolt may then be expanded in any suitable manner so as to prevent retrograde movement of the nut. The spreading of the split end of the bolt forms a wedge-like obstruction to the outward movement of the nut, and the polygonal form of the outer end of the bolt and of the engaging aperture of the lock-nut prevents turning of the latter on the bolt.

Other objects and advantages of the invention will hereinafter appear, and the novel features thereof will be particularly pointed out in the appended claims.

The invention is clearly illustrated in the accompanying drawings, which with the numerals of reference marked thereon form a part of this specification, and in which—

Figure 1 is a perspective view showing the application of the invention. Fig. 2 is a perspective view showing the bolt with its nut and the lock-nut removed. Fig. 3 is a sectional view showing the parts as they appear after the locking-nut has been applied and the end of the bolt expanded. Fig. 4 is a perspective view of modified forms of the nuts.

Like numerals of reference indicate like parts in the several views.

Referring now to the drawings, 1 designates the bolt, provided with screw-threads 2, the portion beyond said threads being polygonal, as seen at 3, and slitted, as shown at 4, to provide the fingers 5. The number of slits and the consequent number of fingers may be varied as circumstances may require.

6 is the nut, threaded upon the bolt in the usual manner and provided upon its outer face with one or more sockets or depressions 7, preferably located one near each corner, as shown.

8 is the lock-nut, having an aperture 9, of a shape corresponding to the polygonal portion of the bolt, and this nut carries upon its inner face a pin, stud, or projection 10, which is adapted to engage in one of the openings or sockets in the outer face of the screw-threaded nut. I have shown but one of these pins or projections; but it is evident that more than one may be employed if found advisable.

In practice the bolt is passed through the rails and fish-plate, (if employed in connection with railway-rails,) and after the screw-threaded nut is screwed up the required distance to firmly bind the parts the outer or lock nut is placed over the polygonal end of the bolt and its pin engaged in the opening or socket in the outer face of the inner nut, and then the slit end of the bolt projecting beyond the outer face of the locking-nut may be spread or upset by any convenient instrument. By this means the locking-nut is prevented against movement outward, so that its pin or projection will always be kept in engagement with the socket or depression of the outer face of the inner nut, and the latter thus prevented against rotation. If from any cause it be desired to screw up the inner nut farther, the fingers of the outer portion of the bolt may be compressed in any suitable manner, so as to allow the locking-nut to be moved outwardly sufficiently to allow its pin or projection to be moved from the socket or depression in the inner nut and the latter then screwed up the required distance, the pin of the locking-nut then being engaged in the bolt or socket in the screw-threaded nut and the outer end of the bolt again expanded.

From the above it will be apparent that I have devised a simple, cheap, yet efficient and reliable form of lock-nut, and while the structural embodiment of the invention as herein disclosed is what I at the present time consider preferable it is evident that the same is subject to changes, variations, and modifications without departing from the spirit of the invention or sacrificing any of its advantages, and I therefore do not intend to restrict myself to the details of construction herein disclosed, but reserve the right to make such changes, variations, and modifications as come properly within the scope of the protection prayed.

It will be evident that there will be sufficient swell and flexibility to the square end of the bolt by reason of the slot or slots to hold the lock rigidly to the screw-nut, and it will also be evident that the nuts may be locked by means other than the pin and slots herein disclosed. For instance, as seen in Fig. 4, the one nut may be provided with a series of radially-disposed grooves and the other with ribs upon the adjacent face for cooperation with said grooves, as seen clearly in said figure.

What is claimed as new is—

1. The combination of a bolt having screw-threads and a polygonal portion longitudinally slitted and adapted to be expanded, of a threaded nut, a locking-nut and means for holding the latter against movement lengthwise of and about said bolt and for locking the same to the threaded nut.

2. The combination with a bolt having screw-threads and a polygonal portion longitudinally slitted and adapted to be expanded, of a threaded nut, a locking-nut having polygonal aperture to correspond with the polygonal portion of the bolt and having means engaging the threaded nut to lock the same together, substantially as described.

3. The combination with a bolt having threads and polygonal portion having longitudinal slits, of a threaded nut for engagement with the threads of the bolt and having sockets in its outer face, and a locking-nut having polygonal aperture to conform to the polygonal portion of the bolt, and a pin projecting from the inner face of said locking-nut to engage a depression in the outer face of the threaded nut.

In testimony whereof I affix my signature in presence of two witnesses.

GEO. W. BROWN.

Witnesses:
GEORGE A. A. DIECKMANN,
J. R. MYERS.